United States Patent [19]

Tengesdal

[11] Patent Number: 4,688,626

[45] Date of Patent: Aug. 25, 1987

[54] VENTILATOR UNIT

[76] Inventor: Paul Tengesdal, N-4387 Bjerkreim, Norway

[21] Appl. No.: 749,552

[22] Filed: Jun. 27, 1985

[30] Foreign Application Priority Data

Jun. 28, 1984 [NO] Norway ................................ 842611

[51] Int. Cl.$^4$ ............................................. F28D 17/00
[52] U.S. Cl. .......................................... 165/4; 165/7; 165/54; 137/311
[58] Field of Search .................. 165/4, 54, 7; 137/311

[56] References Cited

U.S. PATENT DOCUMENTS 1,501,552  7/1924  Bergman ............................ 137/311
3,978,912  9/1976  Penny et al. ........................... 165/4

Primary Examiner—Albert W. Davis, Jr.
Attorney, Agent, or Firm—Schwartz, Jeffery, Schwaab, Mack, Blumenthal & Evans

[57] ABSTRACT

A ventilator unit (1) intended for installation in the outside wall of a room such that used air (A) from the room is vented to the outside atmosphere through the outside wall while fresh air (B) is introduced from the outside and supplied to the unit (1) where it is suitably air conditioned, before being blown into the room, the unit comprising an exhaust fan (12) and an inlet fan (13), and also including for purposes of heat recovery a heat exchanger (15', 15") for transferring heat from the outflowing air (A) to the inflowing fresh air (B), wherein the two streams of air (A, B), as known per se, alternate periodically through two equal regenerator masses.

The heat exchanger comprises two separate heat exchanger assemblies (15', 15") connected to a vane arrangement (20) having adjustable vanes (22–25) for controlling both the outflowing and incoming air streams, the vanes being mounted on a common rotatable shaft (21) which is adapted to be rotated periodically over a certain angle, whereby in one position the exhaust air stream (A) is guided through one (for example 15') of the heat exchangers (15', 15") while simultaneously the incoming air (B) is guided through the second (for example 15") heat exchanger, and in a second position the respective air streams are guided through the opposite heat exchangers, i.e., the incoming air through said first heat exchanger (15') and the exhaust air through said second heat exchanger (15").

4 Claims, 11 Drawing Figures

VENTILATOR UNIT

BACKGROUND

1. Field of the Invention

The present invention relates to a ventilator unit utilizing heat recovery, particularly of the type for installation in an outside wall of a room to be ventilated.

2. Prior Art

The most common way of ventilating rooms in a large building is through a central ventilation system installed in the house or building, wherein air ducts lead from the central installation to the various rooms in the building. The system provides air conditioning as well as heat recovery, filtering, heating, cooling and humidifying.

The incoming conditioned or fresh air is guided through the system of ducts to the various rooms and is blown into the rooms through vents. The used air is drawn out of the room through the same system via a separate system of ducts and exhausted to the outside.

Another common method is to install separate ventilator units in the rooms to be ventilated. This does not require the installation of a system of air ducts in the building, and is often preferred in existing buildings where the installation of air ducts would be difficult and costly. The best location for the ventilator unit is at an outside wall of the room so that air from the outside may be drawn into the room through an opening in the outside wall. In winter, the outside air will be cold and will have to be heated to approximately room temperature before being blown into the room. The used air is often vented to the outside at room temperature, that is, without first having been cooled.

The heating of the incoming air can be reduced significantly through heat recovery, whereby the heat from the air being exhausted is transferred to the incoming cold air. Plate heat exchangers have most commonly been used for this purpose, being both structurally and functionally simple for small room-size ventilator units of this type. The incoming air is blown into the room with great force through a grating in the top plate of the unit. The incoming air mixes with the air in the room with a stirring effect, so-called agitator ventilation. The drawback of agitator ventilation systems is that the pollutants found in the inside air are dispersed about the room and are not vented out until they happen to reach the vicinity of the unit's exhaust vent. Therefore, substantial quantities of fresh air are required for this ventilation system to function adequately, and this in turn results in drafts which may be a problem for people in the room when the air is being blown about with relatively great force. Ceiling light fixtures may also have an adverse effect on the direction of air flow in the room, increasing the drafts.

If it were possible to reduce the amount of incoming air, the size of the unit could also be reduced. Alternately, even if the unit were the same size, the air ducts could be made smaller, which would reduce noise and enable the various components in the unit to work more efficiently. For example, the plate heat exchanger would operate more efficiently, i.e., it would be able to transfer more heat from the used air to the incoming air.

A general problem with the use of plate heat exchangers is that when the outside air is cold, say, a couple of degrees below freezing, frost will form on the lamella in the exhaust air flow ducts, and these must be defrosted in order to maintain the heat recovery effect. This can only be done by stopping the unit until the ice has melted or by opening a bypass valve which causes the incoming air to bypass the plate heat exchanger. During such periods an auxiliary heating element must take care of the entire heating function, since the plate heat exchanger will no longer be operative. The heating aggregate therefore has to be larger in size and capacity than would ideally be necessary, assuming the plate heat exchanger were in constant operation. The melted ice must also be drained off, which means that ventilator units requiring defrosting must be connected to a draining outlet.

Plate heat exchangers have substantially lower efficiency than other known heat recovery systems, for example rotary heat exchangers, which represent a regenerative heat recovery system and which, unlike plate heat exchangers, also are able to transfer moisture as well as heat. Rotary heat exchangers, which are mainly used in large ventilator systems, are relatively complicated structurally and are much too expensive to be used in small room-size ventilator units.

Another type of regenerative heat recovery system is a periodic heat exchanger, in which the respective streams of air alternate between two equal regenerator masses. The prior art periodic heat recovery units, however, are not suitable for use in small ventilator units intended for ventilating a single room.

SUMMARY AND OBJECTS

It is a general object of the present invention to remedy or substantially reduce the drawbacks of known ventilator systems, and in particular to obtain efficient heat recovery in a small ventilator unit.

The vane arrangement to which the two heat exchanger assemblies are connected enables regenerative heat recovery with periodic alteration of the air flows between two equal regenerator masses. The heat recovery system is therefore both simple and highly efficient. Moreover, the unit will function no matter how low the outside air temperature is, and it is in fact at the lowest outside temperatures that the advantages of heat recovery are greatest.

A ventilator unit based on heat recovery in accordance with the invention has a simple construction. The unit permits air to be blown into the room through displacement ventilation, whereby the air enters the room through a large grating in the front panel of the unit at very low speed. The incoming air moves slowly into the room and will rise up around people or other heat generating sources in the room, and the air it displaces will rise up toward the ceiling, where the exhaust vent is located.

Ventilation of the room with the ventilator of the invention is substantially better than with agitator units, and substantially smaller quantities of air are therefore required. Another important advantage is that since the incoming air is supplied directly to the persons in the room without becoming mixed with the warm air at the ceiling of the room, the cooling effect of the outside air will be improved. In the summer, therefore, much of the cooling effect may be achieved by means of the outside air, and there will be less need for an extra cooling unit. Since displacement ventilation is more effective than other corresponding ventilation methods, the amount of incoming air can be reduced without noticeably reducing the effectiveness of the unit. The ventilator unit of the invention, including the vane-controlled heat exchanger, can therefore be made correspondingly smaller in size, which reduces the space requirements and increases the options for positioning the unit within the room. The price of the unit will also be lower than for known units with similar capacity. The apparatus does not need to be connected to a drainage outlet, and it requires less power for heating so that the electrical installation can be reduced correspondingly.

The invention thus comprises a vane arrangement connected to the heat exchanger assemblies which is adapted to control two separate air currents simultaneously, causing both air currents simultaneously to change their direction of flow. The vane assembly comprises a housing containing a rotatably mounted shaft which carries two axially displaced pairs of flaps or vanes, the two vanes in each pair forming an acute angle relative to each other. One of the vanes in each pair may be disposed in the same plane as the oppositely directed vane in the second pair. The shaft is adapted to rotate periodically about an angle of rotation corresponding to the angle formed by the vanes in each pair. The incoming and outflowing air streams flow simultaneously through the housing within two separate chambers, and one pair of vanes alters the direction of flow for the incoming air and the other pair alters the direction of flow of the outgoing air.

The vanes are disposed toward the direction of air flow, and therefore only a small angle of rotation is required of the shaft for changing the direction of flow. In the case of each air stream, one vane of the pair will open to permit the passage of air while the other simultaneously closes, and the same thing occurs simultaneously in the other air stream. The vane arrangement has two sides of connection, one facing toward the heat exchangers and one facing inwardly into the room in which the respective exhaust fan and inlet fan are mounted.

On the side facing toward the heat exchangers the air streams will change outflow openings when the vane shaft rotates, while the air stream on the other side, which faces toward the exhaust fan and inlet fan, will always have the same outflow opening. The exhaust air will thus always flow into the vane housing through the same flow aperture but will change its flow aperture at the outlet of the vane housing. The incoming air changes its flow aperture within the vane housing but always has the same flow aperture at the outlet of the vane housing. In this manner, the air currents change periodically when the vane shaft is rotated, and the apparatus thus functions as a periodically regenerative heat recovery unit.

BRIEF DESCRIPTION OF THE DRAWINGS

The invention will be explained in greater detail in the following with reference to the accompanying drawings showing an exemplary embodiment of the invention, wherein.

DETAILED DESCRIPTION OF THE INVENTION

Figures 1, 2, 3:
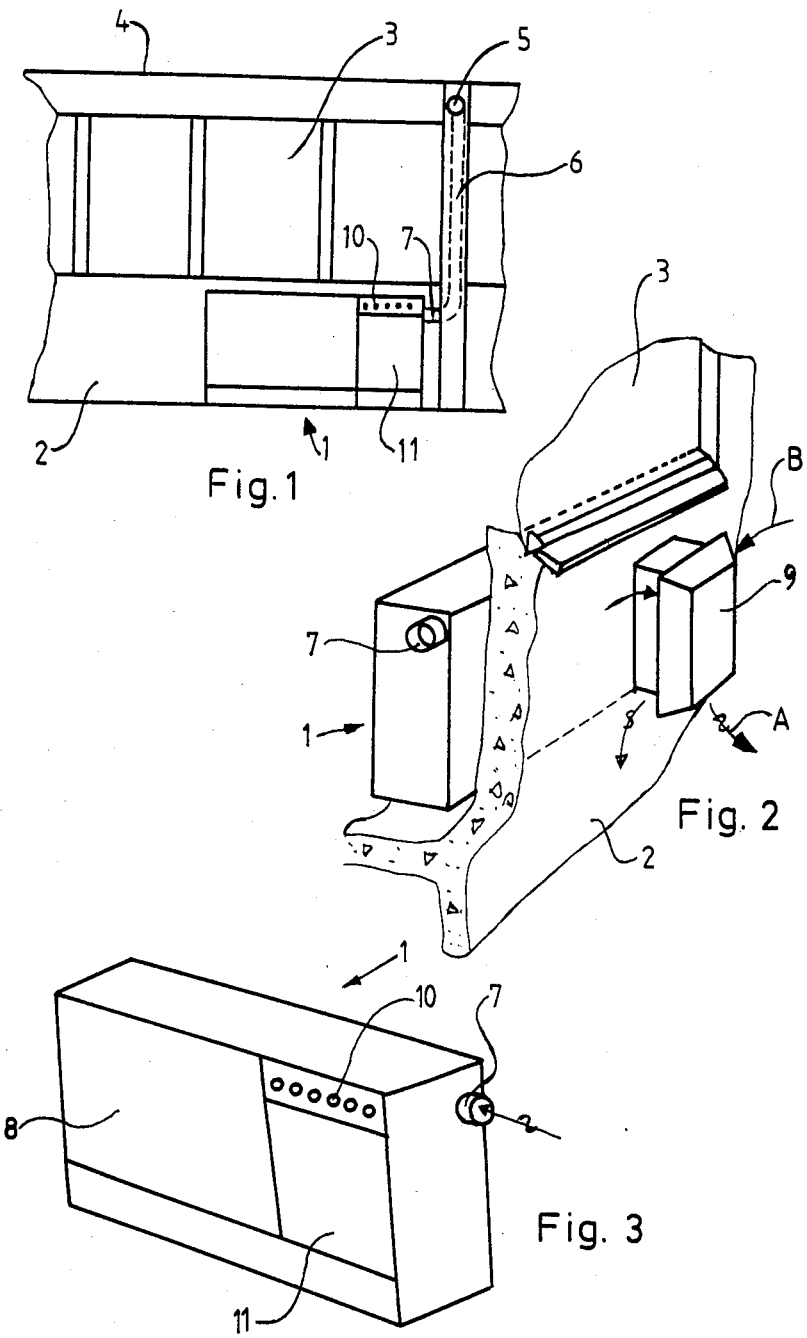
FIG. 1 shows the positioning of the apparatus beneath a window at an outside wall of the room, seen from within the room.
FIG. 2 shows the unit from the exterior of the outside wall, showing a rain hood which covers the exhaust and inlet opening and thus prevents water from entering the unit.
FIGS. 3–5 show the unit in perspective with successive outer covers/components removed to show the internal members/elements of the unit.
Figure 4:
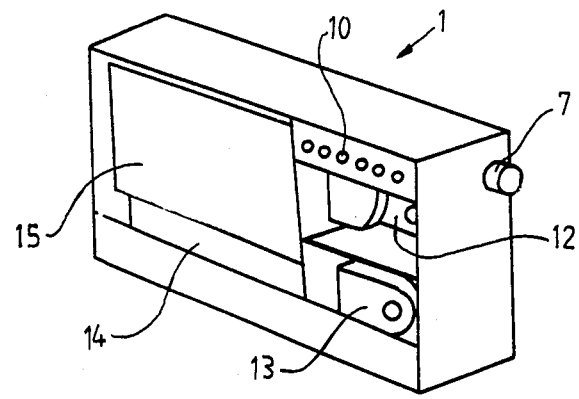
Figure 7:
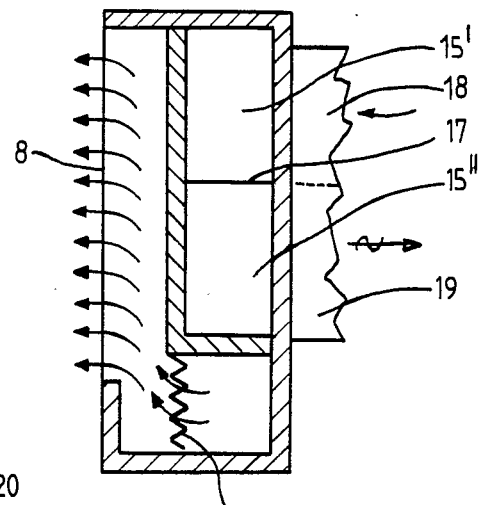
FIG. 7 is a cross section along the line VII—VII in FIG. 6.
Figure 5:
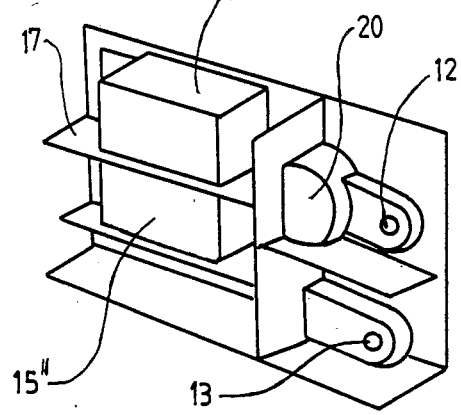

The ventilator unit 1 has the form of a parallelepipedon housing and is installed in an outside wall 2 beneath windows 3. Just below the ceiling 4 is a valve 5 for recovering the used air A from the room. The exhaust air A is supplied to the unit 1 from the valve 5 via a duct 6. The inlet of the unit is designated 7.

The exhaust air A is blown out through the outside wall 2 while incoming air B is drawn in from the outside atmosphere into the unit 1 and is subsequently blown into the room through blower means 8 of known per se embodiment.

The exhaust opening to the outside and the inlet opening for air from the outside are covered by a hood 9 which is formed to prevent water from penetrating into the unit.

The unit has an operating panel 10 on the front wall and a removable inspection cover 11. In a manner known per se, an exhaust fan 12 is provided for exhausting the air from the room, as well as an inlet fan 13 for causing a flow of fresh air into the room. A suitable filter 14 filters the fresh air B as known per se.

The unit 1 is also provided in a manner known per se with a heat exchanger 15 which transfers heat from the outflowing air A to the incoming air B. For additional heating of the incoming air a heating element 16 is provided at the outlet 13 of the fresh air fan. The heat exchanger 15 consists of two heat exchanger sections or assemblies 15' and 15" which are disposed in separate compartments by means of a partition 17, and incoming air B and exhaust air A flow through the heat exchanger. The air streams pass through the outside wall 2 through ducts 18,19.

To ensure efficient heat recovery by means of the heat exchanger 15 (15', 15"), a vane arrangement is provided with adjustable vanes for both the exhaust and incoming air streams.

Figure 9:
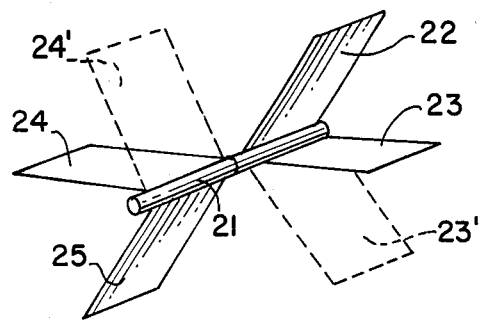
FIGS. 8–11 shows the vane arrangement or parts thereof in perspective view.
Figure 8:
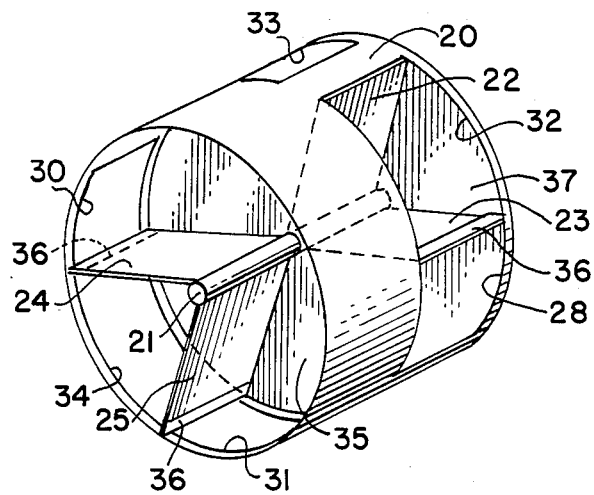
Figure 10:
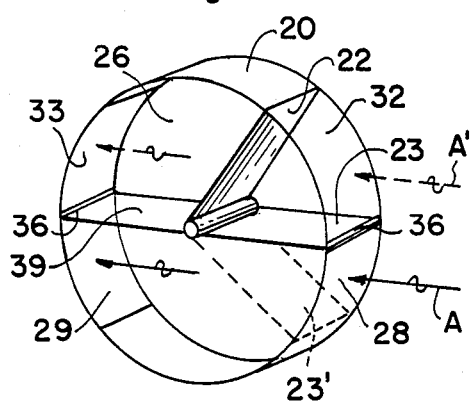
Figure 11:
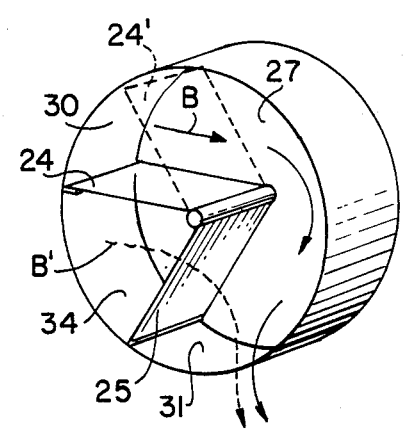

The valve device comprises a vane housing 20 which in the embodiment shown is cylindrical and has ends which are closed by means of end walls. In FIG. 8 one end wall is removed, the reference numeral 37 indicating the other end wall. In the vane housing 20 is a rotatably supported vane shaft 21 carrying two axially displaced pairs of vanes 22, 23 and 24, 25. Each vane consists of a plate-shaped vane extending from the shaft 21 radially outwardly to the circumference of the cylindrical wall of the vane housing 20. Each pair of vanes 22, 23 and 24, 25 includes an acute angle of equal size. The vane housing 20 is divided into two chambers 26, 27 by means of a central partition wall 35 extending perpendicular to the vane shaft 21. The cylindrical circumference wall of the vane housing 20 is formed with inlet and outlet openings 28–34 for the two air flows A, B. The vane pair 22, 23 is rotatable through a certain angle in the vane housing chamber 26, and the vane pair 24, 25 is correspondingly rotatable in the vane housing chamber 27. The shaft 21 can thus be rotated such that the vane 23 comes into position 23' (FIG. 10), and the vane 22 will thereby take the previous position of the vane 23. As all vanes 22-25 accompany the rotation of the common shaft 21, the rotation will cause the vane 24 to come into position 24' (FIG. 11), while the vane 25 will occupy the previous position of the vane 24. This is illustrated in FIGS. 9-11. The shaft 21 has thereby effected a movement describing an angle of rotation corresponding to the angle between the two vanes of each vane pair 22, 23 and 24, 25.

This rotation of the vane shaft 21' is adapted to occur periodically. The inlet and outlet openings 28-34 in the cylindrical circumference wall of the vane housing 20 are defined partly between remaining cylinder wall portions, partly by axially extending stop ledges 36 for the vanes. The shape, size and position of the openings appear best in FIG. 8, where the opening 29 is hidden and only a part of the opening 33 is visible. However, these two openings 29 and 33 appear from FIG. 10.

Figure 6:
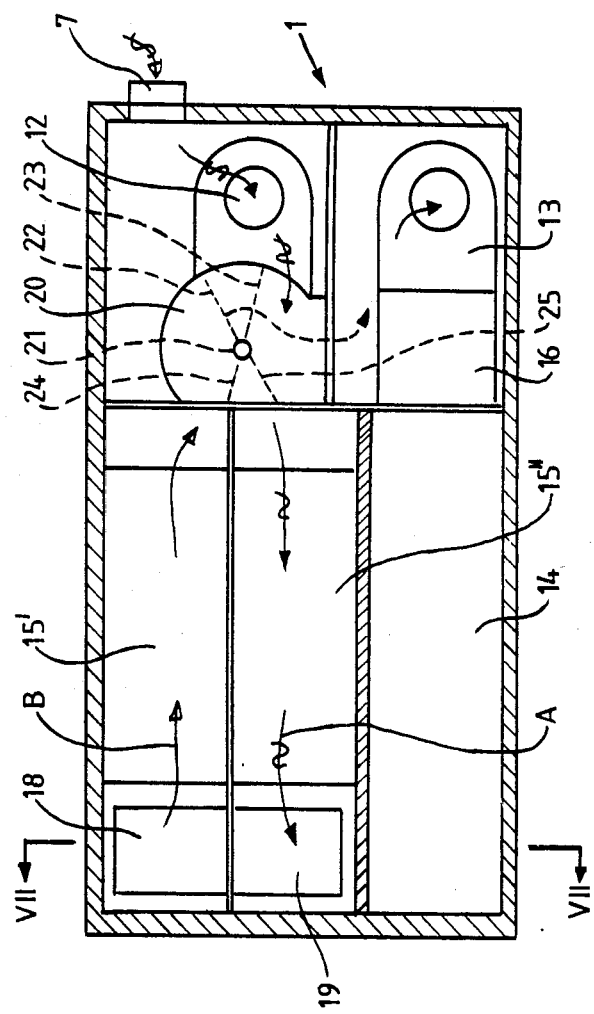
FIG. 6 shows the unit in vertical section on a larger scale in order to illustrate the components shown in FIG. 5 and the filter seen in FIG. 4, in addition to the duct openings for the air streams through the outside wall.

In the vane housing chamber 26 the openings 28 and 32 form inlet openings, and 29 and 33 outlet openings. In the vane housing chamber 27 the two openings 30 and 34 form inlet openings, while the opening 31 forms a common outlet opening for the air supply from both the heat exchanger assembly 15' and the heat exchanger assembly 15". As mentioned, the vane shaft 21 is periodically rotatable such that in one period (when the pair of vanes 22, 23 and 24, 25 assume the position shown in FIG. 8, also representing the position assumed by the vane pairs shown in full lines in FIGS. 9-11), the exhaust air A passes in through the opening 28, because the vane pair 22, 23 surrounds the opening 32, and out of the vane housing chamber 26 through the opening 29, which communicates with the heat exchanger assembly 15" (FIGS. 6 and 10). FIG. 10 shows a fixed, radially extending partition wall 39 separating the outlet openings 29 and 33. Simultaneously, the supply air B flows from the exchanger assembly 15' into the vane housing chamber 27 through the opening 30 (FIG. 11) and out through the opening 31.

In the next period, when the vanes 23 and 24 assume the dotted position according to FIGS. 9-11 and indicated by 23' and 24', respectively, while the vanes 22 and 25 as previously mentioned assume the positions of the vanes 23 and 24, respectively, from the previous period, the exhaust air A passes into the vane housing chamber 26 through the opening 32 and out of the chamber through the opening 33 communicating with the exchanger assembly 15'. The supply air B' simultaneously passes from the exchanger assembly 15" into the vane housing chamber 27 through the opening 34 and out through the same opening 31 as supply air B from the exchanger assembly 15'.

Rotation of the vane shaft 21 over an angle of rotation corresponding to the angle between the vanes of each pair causes thus that in one period the exhaust air A passes through the heat exchanger assembly 15", simultaneously as supply air B passes through the other heat exchanger assembly 15'. In the next period, the exhaust air A' passes through the exchanger assembly 15', while supply air B' now passes through the exchanger assembly 15".

What is claimed is:

1. A ventilator unit for ventilating a room or the like having means for venting exhaust outflowing air to the outside, means for supplying fresh incoming air from the outside, and heat exchanger means for transferring heat from the exhaust air to the fresh incoming air, said heat exchanger means comprising:
   (a) two heat exchanger assemblies;
   (b) a vane arrangement having adjustable vane means for controlling both the outflowing and incoming air streams;
   (c) said vane means being rotatably mounted for guiding exhaust air through a first of said heat exchanger assemblies while incoming air is simultaneously guided through the other of said heat exchanger assemblies and in a second position said air streams are guided through opposite heat exchange assemblies;
   (d) said vane means comprising two pairs of axially displaced vanes mounted on a common shaft, each forming an acute angle of approximately the same size, whereby air flows in the same direction in both positions.

2. The ventilator unit for ventilating a room or the like having means for venting exhaust outflowing air to the outside, means for supplying fresh incoming air from the outside, and heat exchanger means for transferring heat from the exhaust air to the fresh incoming air, said heat exchanger means comprising:
   (a) two heat exchanger assemblies;
   (b) a vane arrangement having adjustable vane means for controlling both the outflowing and incoming air streams;
   (c) said vane means being rotatably mounted for guiding exhaust air through a first of said heat exchanger assemblies while incoming air is simultaneously guided through the other of said heat exchanger assemblies and in a second position said air streams are guided through opposite heat exchange assemblies;
   (d) said vane means comprising two pairs of axially displaced vanes mounted on a common shaft, each forming an acute angle of approximately the same size; and
   (e) wherein a vane of one pair of vanes lies in the same plane as an oppositely directed vane of the second pair.

3. The ventilator unit as defined in claim 2 wherein said shaft is adapted to rotate periodically between two positions which correspond to said acute angle.

4. A ventilator unit utilizing heat recovery, preferably for installation in an outside wall (2) of the room to be ventilated, such that exhaust air (A) is vented to the outside through said outside wall while incoming fresh air (B) is drawn in from the outside and supplied to the ventilator unit (1) where the air suitably conditioned, before being blown into the room, wherein the ventilator unit comprises an exhaust fan (12) for maintaining an outflow of air from the room and an inlet fan (13) for causing an inflow of air into the room, and also includes for the purpose of heat recovery a heat exchanger (15) for transferring heat from the outflowing exhaust air (A) to the incoming fresh air (B), and wherein the respective currents of air (A, B) alternate periodically through two equal regenerator masses in the form of two separate heat exchanger assemblies (15', 15") of said heat exchanger (15), which is connected to a valve device having adjustable vanes (22, 23 and 24, 25), said vanes being axially displaced on a common shaft (21) on either side of a partition wall (35) in a valve housing (20) having inlet and outlet openings (such as 36) for the currents of air (A, B), said shaft (21) which is rotatable in both directions is adapted to rotate periodically a specified angle of rotation, such that in one position the exhaust air (A) is caused to flow through a first (for example 15') of said heat exchanger assemblies (15', 15") while the incoming air flow (B) is simultaneously guided through a second (for example 15") of said heat exchange assemblies, and in a second position the respective air streams (A, B) are guided through the opposite heat exchanger assemblies, the valve device comprising two axially displaced pairs of vanes (22, 23 and 24, 25) on the shaft (21), each forming an acute angle of the same size, such that one vane (22) of a first pair lies in the same plane as an oppositely directed vane (25) of a second pair, and the other vane (23) of the first pair lies in the same plane as the other vane (24) of the second pair (24, 25), the shaft (21) being adapted to rotate periodically over such an angle between its two extreme positions, which corresponds to the angle between the vanes of each pair for ensuring efficient heat recovery/heat transfer.

* * * * *